United States Patent [19]

Sugimoto et al.

[11] 4,414,365
[45] Nov. 8, 1983

[54] PROCESS FOR PRODUCING AN AROMATIC POLYESTER COMPOSITION

[75] Inventors: Hiroaki Sugimoto, Nara; Makoto Hanabata, Takatsuki, both of Japan

[73] Assignee: Sumitomo Chemical Company, Limited, Osaka, Japan

[21] Appl. No.: 356,241

[22] Filed: Mar. 8, 1982

[30] Foreign Application Priority Data

Mar. 16, 1981 [JP] Japan .................................. 56-38308
Apr. 8, 1981 [JP] Japan .................................. 56-53338
Aug. 4, 1981 [JP] Japan .................................. 56-122861
Sep. 2, 1981 [JP] Japan .................................. 56-138727

[51] Int. Cl.³ .......................................... C08G 63/60
[52] U.S. Cl. ............................. 525/437; 525/439; 525/444; 528/125; 528/126; 528/128; 528/173; 528/176; 528/179; 528/193
[58] Field of Search .............. 525/437, 444, 439; 528/125, 126, 128, 173, 179, 176, 193, 271

[56] References Cited

U.S. PATENT DOCUMENTS 3,742,087 6/1973 Nield .................................. 525/444
4,189,549 2/1980 Matsunaga et al. ................. 528/193
4,276,397 6/1981 Froix .................................. 525/437
4,316,004 2/1982 Imai et al. .......................... 528/193

*Primary Examiner*—Lester L. Lee
*Attorney, Agent, or Firm*—Stevens, Davis, Miller & Mosher

[57] ABSTRACT

A process for producing an aromatic polyester composition, which is characterized in that in producing an aromatic polyester represented by the general formula A,

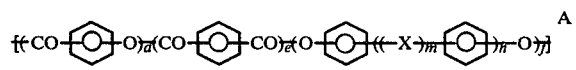

(wherein X is an alkylene group having 1 to 4 carbon atoms, —O—, —SO$_2$—, —S—, or —CO—; m and n are each 0 or 1; the ratio of d to e is in the range of from 1:1 to 10:1; the ratio of e to f is in the range of from 9:10 to 10:9; and the substituents attached to the benzene ring are in para or meta position to one another), the polymerization is carried out by the method of bulk polymerization, using substantially no solvent, and in the presence of at least one polymer selected from the group consisting of polyalkylene terephthalates, polyphenylene sulfides, aromatic polysulfones, and aromatic polyesters represented by the general formula B,

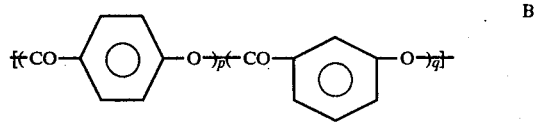

wherein (p+q) is in the range of from 10 to 100 and p/(p+q)≧0.8.

4 Claims, No Drawings

PROCESS FOR PRODUCING AN AROMATIC POLYESTER COMPOSITION

This invention relates to a process for producing an aromatic polyester composition.

Aromatic polyesters generally have excellent properties, originating from their chemical structures, with thermal resistance being especially good. Above all, those aromatic polyesters which are produced from terephthalic or isophthalic acid (or a derivative of these acids), p-hydroxybenzoic acid (or a derivative thereof), and 4,4'-dihydroxydiphenyl (or a derivative thereof) are injection-moldable and are excellent in various physical properties including mechanical and electrical properties and thermal stability, as well as in numerable other properties such as thermal resistance, chemical resistance, oil resistance, radiation resistance, dimensional stability, etc. Because of such excellent performance characteristics, they are employed in various fields including mechanical parts, electrical and electronic parts, and automobile parts. The aromatic polyesters, however, have disadvantages in that they are difficult to mold owing to their high softening points and high melt viscosities, requiring high molding temperatures which give rise to such problems as thermal degradation and discoloration of the polymer upon molding. Therefore, improvement in moldability was eagerly awaited. Moreover, the aromatic polyester has a tendency to become orientated upon injection molding, resulting sometimes in directional inequality of the shrinkage. The anisotropy in mold shrinkage is undesirable from the viewpoint of dimensional stability of the molded product.

One of the known methods to solve the above problems consists in blending with a more easily flowable (more easily moldable) resin such as, for example, polyethylene terephthalate or polycarbonate. However, if the mixing of a blend of polyethylene terephthalate or polycarbonate with an aromatic polyester obtained from terephthalic or isophthalic acid, p-hydroxybenzoic acid and 4,4'-dihydroxydiphenyl, and subsequent granulation and molding are conducted at temperatures sufficiently high for obtaining a homogeneous product, the polyethylene terephthalate or polycarbonate, which has a lower thermal stability, tends to undergo thermal decomposition; whereas if the blend is processed at temperatures sufficiently low to keep the polyethylene terephthalate or polycarbonate from decomposition, the whole mixture will not form a uniformly dispersed mass on account of the insufficient temperature for the satisfactory flow of the aromatic polyester. Although it is conceivable to increase the residence times of the resin system in mixing, granulation and molding steps to effect homogenization of the mixture, the time factor is only relatively minor for the uniform dispersion of the components in this case and it is unrealistic to prolong the residence time until completion of the uniform dispersion.

In another known method, an aromatic polyester having a lower molecular weight is used for the purpose of decreasing the molding temperature and a blend with an easily moldable resin described above is milled, granulated, and molded. This method, however, sacrifices various excellent properties of an aromatic polyester.

It is also conceivable to employ a solution blending technique, but this hardly seems to be realizable, because unfortunately there has not yet been found any solvent which uniformly dissolves an aromatic polyester without causing decomposition.

If the dispersibility is not sufficient, the resin and molded article are partially deteriorated when exposed to a solvent or reagent; variations are seen in every run of molding; and the strength of molded article becomes non-uniform.

As stated above, it may be said that it is difficult to improve the moldability of aromatic polyesters by the known methods of blending.

An entirely different way from the blending is to utilize copolymerization. It consists of inserting by copolymerization a flexible aliphatic unit, such as a segment of ethylene glycol, into a rigid main chain of a polymer such as an aromatic polyester for the purpose of imparting appropriate melt flowability to the latter polymer. Although effective in imparting flowability and improving moldability, this method is not preferable because of considerable decline of excellent characteristics of aromatic polyesters, particularly thermal resistance.

The second problem, the anisotropy mold shrinkage caused by the orientation of an aromatic polyester, may be avoided to a certain degree by selecting suitable injection molding conditions such as injection pressure and injection speed. Such a method, however, has its own limit and there still remains the necessity of improving the resin itself.

A common method for reducing the degree of orientation of a resin comprises the incorporation of fillers which are chiefly inorganic substances such as glass fiber, graphite, quartz, tin oxide, titanium oxide, and talc. A common purpose for the employment of filler is to improve mechanical strength. The rigidity of polyethylene terephthalate or polyamide (nylon) is markedly improved by incorporating a glass fiber. Apart from the reinforcing purposes, fillers are used by virtue of the characteristics of a particular filler or as mere extenders. In the case of aromatic polyesters, although the orientation is reduced by the incorporation of several tens percent of glass fiber, yet the strength (rigidity) of the molded article becomes rather inferior owing to the reduced orientation, as contrasted with the common thermoplastic resins such as polyethylene terephthalate and polyamide (nylon). Aside from the reduction in strength (rigidity), the incorporation of a filler such as glass fiber brings about a problem of damage of the molding machine. There is a case where an unfilled material (resin only) is desirable depending on the intended use of the material. Thus, the method for suppressing the occurrence of orientation of resin itself has not yet been found until now.

Under the circumstances, the present inventors conducted extended studies to improve the moldability (melt flowability) of an aromatic polyester as well as to avoid occurrence of the orientation thereof. This invention is predicated upon the discovery that the above object may be achieved without sacrificing the excellent properties of an aromatic polyester by carrying out the production of an aromatic polyester by the technique of bulk polymerization in the presence of a certain type of polymer in a specified proportion, using substantially no solvent.

According to this invention, there is provided a process for producing an aromatic polyester composition, which is characterized in that in producing an aromatic polyester represented by the general formula A,

A (wherein X is an alkylene group having 1 to 4 carbon atoms, —O—, —SO₂—, —S—, or —CO—; m and n are each 0 or 1; the ratio of d to e is in the range of from 1:1 to 10:1; the ratio of e to f is in the range of from 9:10 to 10:9; and the substituents attached to the benzene ring are in para or meta position to one another), the polymerization is carried out by the technique of bulk polymerization, using substantially no solvent, and in the presence of at least one polymer selected from the group consisting of polyalkylene terephthalates, polyphenylene sulfides, aromatic polysulfones, and aromatic polyesters represented by the general formula B,

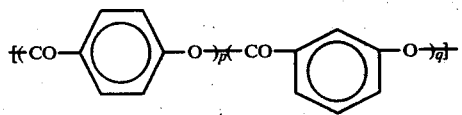

B wherein p+q is in the range of from 10 to 1000 and $[p/(p+q)] \geq 0.8$.

If the polymer used according to this invention as present in the polymerization system producing an aromatic polyester is instead merely blended with an aromatic polyester, the resulting composition is inferior in performance characteristics to the aromatic polyester composition prepared according to this invention. For instance, when polyphenylene sulfide was blended with an aromatic polyester, the moldability of the latter was hardly improved. The reason for this seems to be the difficulty of uniform dispersion. The composition prepared by blending liberated a large volume of gases during molding and failed to give a satisfactory molded product. In another case, the moldability of an aromatic polyester was hardly improved by mere blending, owing presumably to non-uniform dispersion. The molded product from a blend showed a non-uniform pattern on the surface. As contrasted, the aromatic polyester composition prepared according to this invention showed improved moldability compared with an aromatic polyester prepared in the absence of an aforementioned polymer. As compared with the molded product from a mere blend, that formed from the present composition showed more uniform appearance, more uniform internal texture, and less decline of various properties, particularly thermal stability and mechanical strengths. The reason seems to be an improved compatibility resulting from microdispersion of the polymer throughout the aromatic polyester matrix or partial copolymerization.

Examples of the components of aromatic polyesters used in this invention include p-hydroxybenzoic acid, m-hydroxybenzoic acid, terephthalic acid, isophthalic acid, hydroquinone, resorcinol, 4,4'-dihydroxydiphenyl, 4,4'-dihydroxydiphenyl ether, 4,4'-dihydroxydiphenyl sulfone, 4,4'-dihydroxydiphenyl sulfide, 4,4'-dihydroxybenzophenone, 4,4'-dihydroxydiphenylmethane, and derivatives thereof. Among the combinations of these compounds, particularly preferred is that of p-hydroxybenzoic acid or an ester thereof, terephthalic or isophthalic acid or an ester thereof, and 4,4'-dihydroxydiphenyl or an ester thereof.

The polymers to be present in the polymerization system for producing an aromatic polyester include polyethylene terephthalate, polybutylene terephthalate, polyphenylene sulfide; aromatic polysulfones having a structural unit of the formula,

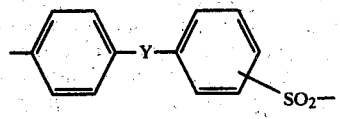

(wherein Y is oxygen atom, sulfur atom, or a moiety of an aromatic diol such as 4,4'-bisphenol) such as, for example, "Victrex" of Imperial Chemical Industries Co. having a repeating unit of

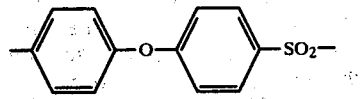

and "Udel" of U.C.C. Co. having a repeating unit of

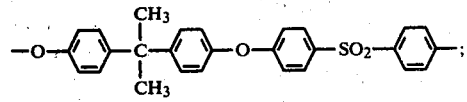

and poly-p-hydroxybenzoic acid.

The amount to be used of the above-noted polymers varies with the intended physical properties, but is generally 5 to 20% by weight based on the resulting composition for a polyalkylene terephthalate, 5 to 30% by weight for polyphenylene sulfide, 5 to 40% by weight for aromatic polysulfone, 5 to 50% by weight for an aromatic polyester represented by the formula B. More particularly, if the polymer is used in an amount below 5%, the effect is unsatisfactory, the composition manifesting no significant difference from the aromatic polyester alone. In the case of a polyalkylene terephthalate, incorporation of more than 20% results in insufficient thermal and mechanical properties, and particularly marked decline of thermal properties such as heat distortion temperature and long-term service temperature. The incorporation of more than 30% of polyphenylene sulfide presents a problem of thermal nature, that is, degradation of the composition during granulation and molding. If incorporated in an amount exceeding 40%, an aromatic polysulfone will cause deterioration of thermal and mechanical properties. In the case of aromatic polyesters represented by general formula B, a low-molecular weight polymer having a polymerization degree in terms of (p+q) of less than 10 exerts less pronounced effect than that exerted by a polymer having a higher molecular weight, presumably because a low-molecular weight polymer is integrated into the main chain of aromatic polyester A by ester exchange reation or the like during polymerization and, as a consequence, the effect of an "easily wettable" filler is lost. As to the polyester B having a polymerization degree of greater than 1,000, the precision of quantitative determination becomes so low that the interrelation between the polymerization degree and the effect becomes obscure. If the amount of polyester B exceeds 50%, the resulting aromatic polyester composition tends to deteriorate in uniformity and mechanical properties.

In producing an aromatic polyester composition according to the present invention, it is possible to modify the polymer by use of a polyfunctional compound. A compound having a monofunctional group such as phenol or p-phenylphenol may be used as a molecular weight regulator.

The polymerization should be carried out by the method of bulk polymerization using substantially no solvent.

Known methods for the production of common aromatic polyesters include the method of solution polymerization which employs an organic solvent capable of dissolving the resulting polymer as the polymerization medium, the method of suspension polymerization in which the resulting polymer precipitates out of the solvent used as polymerization medium, and the method of bulk polymerization which employs no solvent. However, in the case of an aromatic polyester derived from terephthalic or isophthalic acid, p-hydroxybenzoic acid, and 4,4'-dihydroxydiphenyl since no solvent capable of dissolving the polymer has yet been found, it is impossible to use the method of solution polymerization. Although the suspension polymerization may be carried out by using a high-boiling solvent such as hydrogenated terphenyl and a mixture of diphenyl ether and diphenyl, the steps of removal and subsequent recovery of the solvent and the washing of polymer are complicated. This method, moreover, has another economic disadvantage of low production of polymer per unit batch. The method of bulk polymerization, which is employed in the process of this invention, is the most preferable polymerization method also from the economic viewpoint.

The bulk polymerization can be carried out by any of the known procedures. As an example, there is known a procedure in which all of the compounds to compose the aromatic polyester represented by general formula A together with a polymer to be present in the polymerization system are charged at the same time into a reactor. The charged mixture is then allowed to react by heating at about 200° to about 400° C., preferably 250° C. to 350° C., under atmospheric or reduced pressure and in an inert gas atmosphere. It is also possible to accelerate the polymerization by use of a catalyst which leaves a residue with no adverse effect upon the physical properties of the resulting polymer or a residue which may be easily inactivated by simple treatment. A more desirable procedure comprises allowing the polymerization to proceed while continually applying a shearing force to keep the polymerizate from aggregating into a solid mass until substantially the whole polymerization system has turned into the solid phase comprising polydispersed solid polymer. The highest allowable temperature depends partly upon the boiling or decomposition temperature of the monomer, oligomer or polymer which was used. The polymerization is allowed to proceed at first at a comparatively low temperature of 180° to 250° C., then at an elevated temperature of 250° to 380° C., preferably 300° to 360° C. under atmospheric or reduced pressure. After the polymerization system has turned into solid polydispersion, it is possible to further elevate the temperature to 300° to 400° C., preferably 310° to 370° C., taking into account the fusion or decomposition temperature of the polymerizate. The rate of polymerization becomes larger with the temperature unless decomposition or fusion of the polymerizate takes place.

According to still another procedure, all of the compounds to compose the aromatic polyester represented by the formula A and the polymer to be present in the polymerization system are charged at the same time into the first reactor to yield a prepolymer by polycondensation and then the resulting prepolymer is transferred into the second reactor to increase the molecular weight. It is also possible to withdraw the prepolymer in molten state from the first reactor, then grind to a homogeneous composition, and allow the ground prepolymer to increase its molecular weight in the second reactor. Alternatively, the molten prepolymer can be pelletized by means of an extruder and the pelletized prepolymer is allowed to increase its molecular weight in the second reactor.

According to still another procedure, at first the compounds to compose the aromatic polyester of formula A are allowed to react and the polymer to be present in the polymerization system is added not at the same time but portionwise and successively as the polymerization proceeds. If this procedure is used in 2-stage polymerization using first and second reactors, it is preferable to perform the portionwise addition while the formation of aromatic polyester prepolymer is in progress in the first reactor.

The aromatic polyester composition formed as described above shows little discoloration and is excellent in moldability, thermal resistance and mechanical properties.

The aromatic polyester composition obtained according to this invention can be incorporated with additives commonly used in plastics, such as stabilizers, colorants, fillers and the like, in amounts not harmful to the characteristics of the present composition. Examples of suitable fillers include silica, ground quartz or sand, fumed silica, silicon carbide, aluminum oxide, glass fiber, tin oxide, iron oxide, zinc oxide, carbon, graphite, pigments such as titanium dioxide, other inorganic materials, and heat-resistant organic pigments. These fillers can also be added to the polymerization system in preparing the present aromatic polyester composition.

The aromatic polyester composition produced by the present process can be converted into molded articles, film, sheet and the like by compression molding, injection molding, extrusion molding, and the like and widely used as engineering plastics in various fields including machine parts, electric or electronic parts, automobile parts, containers, and packaging materials, where high-level performance characteristics are required.

The invention is illustrated below in detail with reference to Examples and Comparative Examples, but these Examples are merely illustrative and not limitative.

EXAMPLE 1

Into a polymerizer provided with an anchor-type stirrer with a narrow clearance between the stirrer blade and the polymerizer wall, were charged 756 g (5.48 moles) of p-hydroxybenzoic acid, 453 g (2.73 moles) of terephthalic acid, 508 g (2.73 moles) of 4,4'-dihydroxydiphenyl, 169 g (corresponding to 10% by weight of the finally obtained composition) of polyethylene terephthalate ("PET RT–560" of Toyobo Co.), and 1,337 g (13.1 moles) of acetic anhydride. The temperature of the mixture was gradually elevated to 150° C. over a period of one hour, while stirring under a nitrogen atmosphere. After 3 hours of heating at 150° C. under reflux, the temperature was gradually elevated to 330° C., while removing the acetic acid liberated by the reaction and stirring under application of a high shearing force. The polymerization was continued for 2 hours with powerful stirring. After the polymerization mixture had been allowed to cool gradually to 200° C. with powerful stirring, the polymerizate was discharged from the polymerizer to recover 1,570 g (93.1% of theoretical) of polymerizate. The polymerizate was ground and the resulting powder was transferred to an aluminum rotary oven. The temperature of the powder was slowly elevated to 320° C. over a period of 6 hours under a nitrogen stream while rotating the oven to effect thorough stirring. After having been treated for 3 hours at 320° C., the powder was allowed to cool to 200° C. and discharged from the oven to obtain 1,539 g of a powder. The powder was granulated by means of a single-screw extruder ("VS-30-28" of Tanabe Plastics Machinery Co.; screw diameter, 30 mm; L/D=28) under the following conditions: cylinder temperature, 320° C.; screw speed, 50 rpm). The resulting granules were injection molded by means of an injection molding machine ("Neomat N 47/28" of Sumitomo Heavy Industries Co.). The bar flow length was measured at varied injection temperature. The test for bar flow was performed by using a mold having a spiral cavity, 1 mm in depth and 8 mm in width, injecting the sample resin from one end of the spiral cavity under an injection pressure of 1,300 kg/cm$^2$, and measuring the length of molded spiral resin. The results obtained were as shown in Table 1. It is seen that as compared with the results obtained in Comparative Examples 1 to 3 (described later), the resin composition obtained according to this invention showed a broader molding temperature range and was moldable at a comparatively low temperature.

COMPARATIVE EXAMPLE 1

The polymerization and after treatment were carried out in the same manner as in Example 1, except that the polyethylene terephthalate was not added to the polymerization system. There were obtained 1,412 g (93.0% of theoretical) of an aromatic polyester. The resin was granulated and injection molded as in Example 1. The test results were as shown in Table 1. As compared with the resin composition obtained in Example 1, the above resin showed a narrower molding temperature range and required a higher molding temperature.

COMPARATIVE EXAMPLE 2

A resin composition was prepared by stirring in a mixer 900 g of the aromatic polyester obtained in Comparative Example 1 and 100 g of the same polyethylene terephthalate as used in Example 1. The resulting resin composition was granulated and injection molded as in Example 1. The test results were as shown in Table 1. This resin composition showed a molding temperature range somewhat broader than that of the aromatic polyester obtained in Comparative Example 1, but narrower than that of the aromatic polyester composition obtained in Example 1. Moreover, the resin composition required a higher molding temperature and the article molded at 360° C. or higher temperatures showed non-uniform surface, being mottled with burn marks.

COMPARATIVE EXAMPLE 3

Into a reactor, were charged 900 g (5 moles) of p-acetoxybenzoic acid, 415 g (2.5 moles) of terephthalic acid, 675 g (2.5 moles) of diacetylated 4,4'-dihydroxydiphenyl, 154 g (corresponding to 10% by weight based on the finally obtained resin composition) of polyethylene terephthalate ("PET RT-560" of Toyobo Co.), and 1,400 g of a high-boiling solvent ("Santotherm 66" of Mitsubishi Monsanto Chemical Co.). The mixture was heated with continual stirring to 180° C. over a period of one hour under a nitrogen atmosphere and further heated to 320° C. over a period of 10 hours. The stirring was further continued for 16 hours at 320° C. The mixture was then heated at 340° C. for 3 hours to yield a slurry. The reaction mixture in the form of slurry was allowed to cool and admixed with 1,000 g of Santotherm to bring the temperature to 70° C. After addition of 1,920 g of acetone, the slurry was filtered. The powder collected on the filter was extracted with acetone in a Soxlet's apparatus to remove the Santotherm 66. The powder was dried in vacuo at 110° C. to obtain 1,328 g (86.0% of theoretical) of an aromatic polyester composition. The powder was transferred into an aluminium rotary oven. While rotating the oven to effect thorough stirring, the powder was kept at 200° C. for 10 hours under a nitrogen stream, then gradually heated to 300° C. over a period of 6 hours and kept at 300° C. for 2 hours. After having been cooled to 200° C., the powder was removed from the oven, then granulated, and injection molded as in Example 1. The test results were as shown in Table 1. This aromatic polyester composition showed a molding temperature range slightly broader than that of the aromatic polyester obtained in Comparative Example 1, but narrower than that of the aromatic polyester composition obtained in Example 1 and required a higher molding temperature. The surface of the molded article revealed the occurrence of orientation and non-uniformity due to some burn marks.

TABLE 1

| Resin or resin composition | Molding temp. (cylinder temp.) which gives bar flow length of 30 cm or more (°C.) | Surface appearance of molded article |
|---|---|---|
| Example 1 | 300–370 | Fine |
| Comparative Example 1 | 370–400 | Occurrence of orientation. |
| Comparative Example 2 | 330–370 | Burn mark and non-uniformity at molding temp. of 360° C. or above. |
| Comparative Example 3 | 340–380 | Orientation, burn mark, and non-uniformity. |

EXAMPLE 2

Each 600 g of the resin and resin compositions obtained in Example 1 and Comparative Examples 1 to 3 was blended with 400 g of glass fiber to form a nearly uniform mixture. The mixture was pelletized as in Example 1. Using various molds the pellets were injection molded to prepare dumbbell test pieces and test pieces for testing Izod impact strength and weld line strength. The test results were as shown in Table 2.

TABLE 2

| Resin or resin composition | Molding temp., °C. | Appearance of molded article | Tensile strength, kg/cm² | Tensile modulus of elasticity, kg/cm² | Izod impact strength (notched), kg·cm/cm | Weld line flexural strength, kg/cm² |
|---|---|---|---|---|---|---|
| Example 1 | 330 | Fine | 1190 | 34000 | 9.3 | 680 |
|  | 350 | Fine | 1220 | 34300 | 9.5 | 710 |
| Comparative Example 1 | 380 | Fine | 924 | 32300 | 8.3 | 333 |
|  | 400 | Fine | 980 | 34300 | 8.7 | 340 |
| Comparative Example 2 | 340 | Non-uniform; burn mark | 460 | 20500 | 1.6 | 130 |
|  | 360 | Non-uniform; burn mark | 520 | 21000 | 2.1 | 160 |
| Comparative Example 3 | 350 | Orientation | 1288 | 41000 | 6.8 | 310 |
|  | 370 | Orientation; burn mark | 1022 | 39100 | 4.3 | 290 |

As compared with the resin or resin compositions obtained in Comparative Examples 1 to 3, the resin composition obtained in Example 1 showed superior physical properties which are dependent upon molding temperature to a smaller degree; particularly, the difference in weld line strength was marked. Compared with the resin composition of Example 1, the resin obtained in comparative Example 1 showed somewhat inferior physical properties which were dependent upon molding temperature to a somewhat larger degree. The resin composition of comparative Example 2 revealed extremely inferior physical properties. The resin composition of comparative Example 3 showed a higher tensile strength and a higher tensile modulus of elasticity due presumably to the orientation visible on the surface and the degree of dependence of physical properties upon molding temperature was larger compared with the resin composition of Example 1.

EXAMPLE 3

Into the same vessel as used in Example 1, were charged 756 g (5.48 moles) of p-hydroxybenzoic acid, 453 g (2.73 moles) of terephthalic acid, 410 g (2.20 moles) of 4,4'-dihydroxydiphenyl, 59.4 g (0.54 mole) of hydroquinone, 369 g (corresponding to 20% by weight based on the ultimate resin composition) of polyethylene terephthalate ("PET-RT-560" of Toyobo Co.), and 1,337 g (13.1 moles) of acetic anhydride. The mixture was treated as in Example 1 to obtain a resin composition. A nearly uniform mixture was prepared by blending 600 g of the above resin composition and 400 g of glass fiber. The resulting blend was granulated and injection molded. The test results were as shown in Table 3.

Petroleum Co.), and 1,337 g (13.1 moles) of acetic anhydride. The temperature of the mixture was gradually elevated to 150° C. over a period of one hour, while stirring under a nitrogen atmosphere. After 3 hours of heating of 150° C. under reflux, the temperature was gradually elevated to 330° C., while removing the acetic acid liberated by the reaction and stirring under application of a high shearing force. The polymerization was continued for further 2 hours with vigorous stirring. After the polymerization mixture had been allowed to cool gradually to 200° C. with vigorous stirring, the polymerizate was discharged from the polymerizer to recover 1,550 g (91.9% of theoretical) of polymerizate. The polymerizate was ground and the resulting powder was transferred into an aluminum rotary oven. The temperature of the powder was slowly elevated to 320° C. over a period of 6 hours under a nitrogen stream while rotating the oven to effect thorough stirring. After having been treated for 3 hours of 320° C., the powder was allowed to cool to 200° C. and discharged from the oven to obtain 1,520 g of a powder. Similarly to Example 1 the powder was granulated, injection molded, and tested for physical properties. The test results were as shown in Table 4. It is seen that as compared with the resin obtained in Comparative Example 1 and the resin compositions obtained in Comparative Examples 4 and 5 (described later), the resin composition obtained in the present Example showed a broader molding temperature range and can be molded at comparatively low temperatures. The surface of the article molded from the present resin composition was smooth and the degree of dependence of physical properties upon molding temperature was small.

TABLE 3

| Molding temp. which gives bar flow length of 30 cm or more, °C. | Molding temp., °C. | Appearance of molded article | Tensile strength, kg/cm² | Izod impact strength (notched), kg·cm/cm | Weld line flexural strength, kg/cm² |
|---|---|---|---|---|---|
| 280–350 | 290 | Fine | 1050 | 9.5 | 712 |
|  | 310 | Fine | 1120 | 9.6 | 712 |
|  | 330 | Fine | 1180 | 9.7 | 720 |

The molding temperature range was broad and the degree of dependence of physical properties upon molding temperature was small.

EXAMPLE 4

Into the same polymerizer as used in Example 1, were charged 756 g (5.48 moles) of p-hydroxybenzoic acid, 453 g (2.73 moles) of terephthalic acid, 508 g (2.73 moles) of 4,4'-dihydroxydiphenyl, 169 g (corresponding to 10% by weight based on the ultimate resin composition) of polyphenylene sulfide ("Ryton V-1" of Phillips

COMPARATIVE EXAMPLE 4

A resin composition was prepared by mixing and stirring in a mixer 900 g of the aromatic polyester obtained in Comparative Example 1 and 100 g of the same polyphenylene sulfide as used in Example 4. The resulting resin composition was granulated and injection molded as in Example 1. The test results were as shown in Table 4. The resin composition obtained above showed a molding temperature range which is somewhat broader than that of the resin composition of Example 4. The molded article was not uniform and showed burned marks in the case of high temperature molding; moreover, the physical properties were generally inferior.

COMPARATIVE EXAMPLE 5

Into a reactor, were charged 900 g (5.0 moles) of p-acetoxybenzoic acid, 415 g (2.5 moles) of terephthalic acid, 675 g (2.5 moles) of diacetylated 4,4'-dihydroxydiphenyl, 154 g (10% by weight based on ultimate resin composition) of polyphenylene sulfide ("Ryton V-1" of Phillips Petroleum Co.), and 1,400 g of a high-boiling solvent ("Santotherm 66"). The polymerization and after treatment were carried out in a manner similar to that in Comparative Example 3. The resulting resin composition was granulated, injection molded, and tested. The test results were as shown in Table 4. The resin composition showed a molding temperature range comparable to that of the resin composition of Comparative Example 4 and narrower than that of the resin composition of Example 4. The molded article was not uniform and showed burn marks in the case of high temperature molding. The physical properties were also inferior to those of the resin composition obtained in Example 4.

EXAMPLE 5

Each 600 g of the resin and resin compositions obtained in Example 4 and Comparative Examples 1, 4 and 5 was blended with 400 g of glass fiber to form a nearly uniform mixture. The mixture was granulated, injection molded, and tested. The test results were as shown in Table 5.

TABLE 5

| Resin or resin composition | Molding temp., °C. | Appearance of molded article | Tensile strength, kg/cm² | Izod impact strength (notched), kg · cm/cm | Weld line flexural strength, kg/cm² | Heat distortion temp. (18.6 kg/cm²), °C. |
|---|---|---|---|---|---|---|
| Example 4 | 340 | Fine | 1150 | 9.5 | 530 | 288 |
|  | 360 | Fine | 1180 | 9.6 | 540 | 290 |
| Comparative Example 1 | 380 | Fine | 930 | 8.1 | 310 | 302 |
|  | 400 | Fine | 990 | 8.7 | 330 | 303 |
| Comparative Example 4 | 360 | Non-uniform | 540 | 1.7 | 130 | 248 |
|  | 380 | Non-uniform; burn mark | 620 | 2.1 | 180 | 252 |
| Comparative Example 5 | 360 | Non-uniform | 750 | 2.2 | 300 | 264 |
|  | 380 | Non-uniform; burn mark | 900 | 2.9 | 320 | 266 |

EXAMPLE 6

Into the same vessel as used in Example 1, were charged 756 g (5.48 moles) of p-hydroxybenzoic acid, 453 g (2.73 moles) of terephthalic acid, 410 g (2.20 moles) of 4,4'-dihydroxydiphenyl, 59.4 g (0.54 mole) of hydroquinone, 369 g (20% by weight of ultimate resin composition) of polyphenylene sulfide ("Ryton V-1" of Phillips Petroleum Co.), and 1,337 g (13.1 moles) of acetic anhydride. The mixture was treated in the same manner as in Example 1 to obtain a resin composition. A nearly uniform mixture was prepared by mixing 600 g of the above resin composition and 400 g of the same glass fiber as used in Example 2. The mixture was granulated, injection molded, and tested. The test results were as shown in Table 6.

TABLE 4

| Resin or resin composition | Molding temp. (cylinder temp.) which gives bar flow length of 30 cm or more, °C. | Molding temp., °C. | Appearance of molded article | Tensile strength, kg/cm² | Izod impact strength (notched), kg · cm/cm |
|---|---|---|---|---|---|
| Example 4 | 330–380 | 340 | Fine | 1344 | 23.2 |
|  |  | 360 | Fine | 1376 | 23.8 |
| Comparative Example 1 | 370–400 | 380 | Orientation | 1316 | 19.2 |
|  |  | 400 | Orientation | 1120 | 23.2 |
| Comparative Example 2 | 350–390 | 360 | Non-uniform | 460 | 2.5 |
|  |  | 380 | Non-uniform; burn mark | 580 | 3.8 |
| Comparative Example 3 | 350–390 | 360 | Non-uniform | 730 | 5.8 |
|  |  | 380 | Non-uniform; burn mark | 820 | 6.2 |

TABLE 6

| Molding temp. which gives bar flow length of 30 cm or more, °C. | Molding temp., °C. | Appearance of molded article | Tensile strength, kg/cm² | Izod impact strength (notched), kg · cm/cm | Weld line flexural strength, kg/cm² | Heat distortion temp. (18.6 kg/cm²), °C. |
|---|---|---|---|---|---|---|
| 320–380 | 330 | Fine | 1020 | 10.2 | 585 | 272 |
|  | 350 | Fine | 1050 | 10.8 | 630 | 274 |
|  | 370 | Fine | 1070 | 11.2 | 670 | 275 |

EXAMPLE 7

Into the same vessel as used in Example 1, were charged 1,121.9 g (8.13 moles) of p-hydroxybenzoic acid, 449.9 g (2.71 moles) of terephthalic acid, 504.1 g (2.71 moles) of 4,4'-dihydroxydiphenyl, 786 g (30% by weight based on ultimate resin composition) of polyphenylene sulfide ("Ryton V-1" of Phillips Petroleum Co.), and 1,659 g (16.26 moles) of acetic anhydride. The mixture was treated in the same manner as in Example 1 to obtain a resin composition. A nearly uniform mixture was prepared by mixing 600 g of the resin composition obtained above and 400 g of glass fiber. The mixture was granulated, injection molded, and tested. The test results were as shown in Table 7.

COMPARATIVE EXAMPLE 6

A resin composition was prepared by mixing and stirring in a super mixer 900 g of the aromatic polyester resin and 100 g of the same polyester sulfone as used in Example 8. The resulting resin composition was granulated and injection molded as in Example 1. The test results were as shown in Table 8. The molding temperature range of the above resin composition was somewhat broader than that of the aromatic polyester obtained in Comparative Example 1, but was narrower than that of the resin composition obtained in Example 8. The molded article was non-uniform and showed some burn marks in the case of high temperature molding. The physical properties were generally inferior.

TABLE 7

| Molding temp. which gives bar flow length of 30 cm or more, °C. | Molding temp., °C. | Appearance of molded article | Tensile strength, kg/cm² | Izod impact strength (notched), kg · cm/cm | Weld line flexural strength, kg/cm² | Heat distortion temp. (18.6 kg/cm²), °C. |
|---|---|---|---|---|---|---|
| 300–370 | 320 | Fine | 980 | 9.6 | 720 | 257 |
|  | 340 | Fine | 980 | 10.3 | 700 | 260 |
|  | 360 | Fine | 960 | 9.2 | 680 | 260 |

EXAMPLE 8

Into the same polymerizer as used in Example 8, were charged 756 g (5.48 moles) of p-hydroxybenzoic acid, 453 g (2.73 moles) of terephthalic acid, 508 g (2.73 moles) of 4,4'-dihydroxydiphenyl, 169 g (10% by weight based on ultimate resin composition) of polyether sulfone ("Victrex 100P" of Imperial Chemical Industries Co.), and 1,337 g (13.1 moles) of acetic anhydride. The polymerization was carried out in the same manner as in Example 1 to recover 1,570 g (93.1% of theoretical) of a resin composition. The after treatment gave 1,540 g of the resin composition which was granulated, injection molded, and tested for physical properties. The test results were as shown in Table 8. This resin composition showed a broader molding temperature range than those of the resin obtained in Comparative Example 1 and resin compositions obtained in Comparative Examples 6 and 7 (shown later). The resin composition, moreover, was moldable at comparatively low temperatures. The molded article had smooth surface and the degree of dependence of physical properties upon molding temperature was small.

COMPARATIVE EXAMPLE 7

Into a reactor, were charged 900 g (5.0 moles) of p-acetoxybenzoic acid, 415 g (2.5 moles) of terephthalic acid, 675 g (2.5 moles) of diacetylated 4,4'-dihydroxydiphenyl, 154 g (10% by weight based on ultimate resin composition) of polyether sulfone ("Victrex 100P" of Imperial Chemical Industries Co.), and 1,400 g of a high-boiling solvent ("Santotherm 66" of Mitsubishi Monsanto Chemical Co.). Under a nitrogen atmosphere, polymerization and after treatment were carried out as in Comparative Example 3. The resulting resin composition was granulated and injection molded. The test results were as shown in Table 8. The molding temperature range of this resin composition was comparable to that of the resin composition of Comparative Example 6 but was narrower than that of the resin composition obtained in Example 8. The molded article was not uniform and showed some burn marks in the case of high temperature molding. The physical properties were inferior to those of the resin composition obtained in Example 8.

TABLE 8

| Resin or resin composition | Molding temp. (cylinder temp.) which gives bar flow length of 30 cm or more, °C. | Molding temp., °C. | Appearance of molded article | Tensile strength, kg/cm² | Izod impact strength (notched), kg · cm/cm |
|---|---|---|---|---|---|
| Example 8 | 340–400 | 360 | Fine | 1320 | 24.1 |
|  |  | 380 | Fine | 1341 | 24.3 |
| Comparative Example 1 | 370–400 | 380 | Orientation | 1316 | 19.2 |
|  |  | 400 | Orientation | 1120 | 21.1 |
| Comparative Example 6 | 360–400 | 370 | Non-uniform | 930 | 12.1 |
|  |  | 390 | Non-uniform, burn mark | 950 | 13.3 |
| Comparative Example 7 | 360–400 | 370 | Non-uniform, burn mark | 630 | 5.2 |
|  |  | 390 | Non-uniform, burn mark | 740 | 7.8 |

EXAMPLE 9

In a manner similar to that in Example 8, polymerization was carried out in the presence of 10, 20, 30 or 40% by weight (based on ultimate resin composition) of the same polyether sulfone as used in Example 8. The resulting resin composition was pelletized as in Example 1 and injected into verious molds to prepare dumbbell test pieces and test pieces for testing Izod impact strength, weld line strength and heat distortion temperature. The test results were as shown in Table 9, in which are also shown the test results obtained in the cases where the amounts of polyether sulfone were 0 and 50% for comparison.

TABLE 9

| Amount of polyether sulfone in resin composition, wt. - % | Molding temp., °C. | Appearance of molded article | Tensile strength, kg/cm² | Izod impact strength (notched), kg · cm/cm | Weld line flexural strength, kg/cm² | Heat distortion temp. (18.6 kg/cm²), °C. |
|---|---|---|---|---|---|---|
| 0 (Reference) | 380 | Orientation | 1316 | 19.2 | 45 | ≧300 |
|  | 400 | Orientation | 1120 | 23.2 | 60 | ≧300 |
| 10 | 360 | Fine | 1320 | 24.1 | 452 | ≧300 |
|  | 380 | Fine | 1341 | 24.3 | 461 | ≧300 |
| 20 | 360 | Fine | 1388 | 25.6 | 693 | ≧300 |
|  | 380 | Fine | 1370 | 25.2 | 701 | ≧300 |
| 30 | 350 | Fine | 1320 | 20.3 | 688 | ≧300 |
|  | 370 | Fine | 1338 | 21.3 | 695 | ≧300 |
| 40 | 340 | Fine | 1295 | 18.5 | 712 | 295 |
|  | 360 | Fine | 1300 | 18.7 | 735 | 296 |
| 50 (Reference) | 340 | Fine | 870 | 7.2 | 726 | 276 |
|  | 360 | Fine | 880 | 7.4 | 735 | 277 |

It is seen that the incorporation of polyether sulfone in the polymerization system improved the appearance of the molded article and also improved the physical properties, especially the improvement of weld line strength. The degree of dependence of physical properties upon molding temperature became smaller. When the polyether sulfone content of the resin composition was increased to 50% by weight, physical properties generally declined, though the appearance was improved.

EXAMPLE 10

Into the same vessel as used in Example 1, were charged 1,122 g (8.13 moles) of p-hydroxybenzoic acid, 450 g (2.71 moles) of terephthalic acid, 504 g (2.71 moles) of 4,4′-dihydroxydiphenyl, 458.7 g (20% by weight based on ultimate resin composition) of polysulfone ("P-1700" of Union Carbide Corp.), and 1,659 g of acetic anhydride. The mixture was treated in the same manner as in Example 1 to obtain 2,112 g (92.1% of theoretical) of a resin composition. The resin composition was granulated, injection molded, and tested for physical properties. The test results were as shown in Table 10.

TABLE 10

| Molding temp. which gives bar flow length of 30 cm or more, °C. | Molding temp., °C. | Appearance of molded article | Tensile strength, kg/cm² | Izod impact strength (notched), kg · cm/cm | Weld line flexural strength, kg/cm² | Heat distortion temp., °C. |
|---|---|---|---|---|---|---|
| 320–380 | 330 | Fine | 1340 | 23.1 | 611 | 296 |
|  | 350 | Fine | 1345 | 23.1 | 621 | 296 |
|  | 370 | Fine | 1351 | 25.1 | 625 | 297 |

EXAMPLE 11

Into the same vessel as used in Example 1, were charged 756 g (5.48 moles) of p-hydroxybenzoic acid, 453 g (2.73 moles) of terephthalic acid, 410 g (2.20 moles) of 4,4′-dihydroxydiphenyl, 59.4 g (0.54 mole) of hydroquinone, 369 g (20% by weight based on ultimate resin composition) of polyether sulfone ("Victrex 200P" of Imperial Chemical Industries Co.), and 1,337 g (13.1 moles) of acetic anhydride. The mixture was treated as in Example 1 to obtain a resin composition. A nearly uniform mixture was prepared by mixing 600 g of this resin composition and 400 g of glass fiber. The mixture was granulated, injection molded, and tested. The test results were as shown in Table 11.

TABLE 11

| Molding temp. which gives bar flow length of 30 cm or more, °C. | Molding temp., °C. | Appearance of molded article | Tensile strength, kg/cm² | Izod impact strength (notched), kg · cm/cm | Weld line flexural, strength kg/cm² | Heat distortion temp., °C. |
|---|---|---|---|---|---|---|
| 330–390 | 340 | Fine | 1000 | 8.4 | 730 | 282 |
|  | 360 | Fine | 1020 | 8.3 | 732 | 283 |
|  | 380 | Fine | 1020 | 8.4 | 725 | 282 |

REFERENCE EXAMPLE 1

Into a polymerizer provided with an anchor-type stirrer with a narrow clearance between the stirrer blade and the polymerizer wall, were charged 2,072 g (15 moles) of p-hydroxybenzoic acid and 1,685 g (16.5 moles) of acetic anhydride. The temperature of the mixture was gradually elevated to 150° C. over a period of one hour, while stirring under a nitrogen atmosphere. After 3 hours of heating at 150° C. under reflux, the temperature was gradually elevated to 330° C., while removing the acetic acid liberated by the reaction and stirring under application of a high shearing force. The polymerization was continued for further one hour with vigorous stirring. After the polymerization mixture had been allowed to cool gradually to 200° C. with vigorous stirring, the polymerizate was discharged from the polymerizer to recover 1,740 g (96.7% of theoretical) of polymerizate. The polymerizate was ground and the resulting powder was transferred to an aluminum rotary oven. The temperature of the powder was slowly elevated to 370° C. over a period of 6 hours under a nitrogen stream while rotating the oven to effect thorough stirring. After having been treated for 3 hours at 370° C., the powder was allowed to cool to 200° C. and discharged from the oven to obtain 1,680 g of a powder. The number-average polymerization degree of this polyester was 85, as determined by the method of terminal group determination.

REFERENCE EXAMPLE 2

Into the same vessel as used in Reference Example 1, were charged 1,926 g (9.0 moles) of phenyl p-hydroxybenzoate and 214 g (1.0 mole) of phenyl m-hydroxybenzoate. The temperature of the mixture was elevated, while stirring under a nitrogen atmosphere and removing the phenol liberated by the reaction. The polycondensation was carried out in the same manner as in Reference Example 1 to obtain 1,120 g (93.3% of theoretical) of a polymerizate which had a number-average polymerization degree of 25, as determined by the method of terminal group determination.

proved, presumably indicating an improvement in melt flowability.

COMPARATIVE EXAMPLE 8

A resin composition was prepared by mixing in a super mixer 800 g of the polyester obtained in Comparative Example 1 and 200 g of the polyester obtained in Reference Example 1. The resulting resin composition was granulated and molded in the same manner as in Example 12. The test results were as shown in Table 12. As compared with the resin composition obtained in Example 12, the resin composition obtained above was inferior in physical properties and the molded article revealed surface nonuniformity.

COMPARATIVE EXAMPLE 9

In this Comparative Example a resin composition was prepared by the method of suspension polymerization. Into a reactor, were charged 900 g (5.0 moles) of p-acetoxybenzoic acid, 415 g (2.5 moles) of terephthalic acid, 675 g (2.5 moles) of diacetylated 4,4'-dihydroxydiphenyl, 347.5 g (20% by weight based on ultimate resin composition) of the polyester obtained in Reference Example 1, and 1,400 g of a high-boiling solvent ("Santotherm 66" of Mitsubishi Monsanto Chemical Co.). The mixture was polymerized and after-treated under a nitrogen atmosphere in the same manner as in Comparative Example 3. The resulting resin composition was granulated and molded as in Example 12. The test results were as shown in Table 12. The molded article showed orientation and the physical properties were inferior to those of the resin composition obtained in Example 12.

TABLE 12

| Resin or resin composition | Molding temp. (cylinder temp.), °C. | Appearance of molded article | Tensile strength, kg/cm$^2$ | Izod impact strength (notched), kg·cm/cm | Weld line flexural strength, kg/cm$^2$ | Heat distortion temp. (18.6 kg/cm$^2$), °C. |
|---|---|---|---|---|---|---|
| Example 12 | 360 | Fine; no orientation | 1230 | 8.2 | 680 | >300 |
|  | 380 | Fine; no orientation | 1250 | 8.3 | 710 | >300 |
| Comparative Example 1 | 370 | Orientation | 1320 | 16.2 | 55 | >300 |
|  | 390 | Orientation | 1280 | 19.1 | 70 | >300 |
| Comparative Example 8 | 370 | Non-uniform | 900 | 6.1 | 230 | 273 |
|  | 390 | Non-uniform; burn mark | 875 | 6.3 | 210 | 275 |
| Comparative Example 9 | 370 | Non-uniform; burn mark | 630 | 4.1 | 190 | 258 |
|  | 390 | Non-uniform; burn mark | 750 | 4.4 | 205 | 260 |

EXAMPLE 12

Into the same polymerizer as used in Example 1, were charged 910.8 g (6.6 moles) of p-hydroxybenzoic acid, 547.8 g (3.3 moles) of terephthalic acid, 613.8 g (3.3 moles) of 4,4'-dihydroxydiphenyl, 458.7 g (20% by weight based on the ultimate resin composition) of the polymer obtained in Reference Example 1, and 1,613.2 g (15.8 moles) of acetic anhydride. The polymerization and after treatment were carried out in the same manner as in Example 1 to obtain 2,138 g of a resin composition. The resin composition was granulated at 350° C., injection molded, and tested for physical properties. The test results were as shown in Table 12. The orientation on the surface of molded article was reduced and the appearance was smooth. The weld line strength was improved, presumably indicating an improvement in melt flowability.

EXAMPLE 13

In a manner similar to that in Example 12, polymerization was carried out in the presence of 10, 20, 30, 40 or 50% by weight (based on ultimate resin composition) of the polymer obtained in Reference Example 1 to obtain respective resin compositions. Each composition was granulated, molded, and tested for physical properties as in Example 12. The results were as shown in Table 13, in which are also shown the results obtained in the cases where the amounts of said polymer of Reference Example 1 were 0 and 60% by weight for comparison. The mold shrinkage was determined by molding a shrinkage plate specimen and measuring its dimensions. The percentage shrinkage was determined in both the direction of machine axis (MD) and the direction perpendicular to the machine axis (TD). The molding temperature shown in the Table represents the optimum molding temperature (estimated from the viewpoint of balanced characteristics).

TABLE 13

| Amount of polyester of Ref. Ex. 1 in resin composition, wt. - % | | Molding temp., °C. | Appearance of molded article | Tensile strength, kg/cm² | Weld line flexural strength, kg/cm² | Mold shrinkage, % | |
|---|---|---|---|---|---|---|---|
| | | | | | | MD | TD |
| 0 | (reference) | 390 | Orientation | 1280 | 70 | 0.1 | 2.1 |
| 10 | | 390 | Fine | 1250 | 530 | 0.1 | 1.5 |
| 20 | | 380 | Fine | 1250 | 710 | 0.1 | 1.4 |
| 30 | | 380 | Fine | 1180 | 780 | 0.2 | 1.2 |
| 40 | | 380 | Fine | 980 | 730 | 0.2 | 1.0 |
| 50 | | 380 | Fine | 920 | 700 | 0.2 | 0.9 |
| 60 | (reference) | 380 | Fine | 650 | 350 | 0.2 | 0.8 |

The presence of the polyester of Reference Example 1 improved the appearance of molded article, markedly increased the weld line strength, and reduced the anisotropy of mold shrinkage (difference between MD and TD), indicating a reduction in orientation. When the amount of said polyester was increased to 60% by weight, and mechanical strengths declined.

EXAMPLE 14

An aromatic polyester composition was prepared by repeating the procedure of Example 12, except that the polymerization was carried out in the presence of 20% by weight (based on ultimate aromatic polyester composition) of the polymer obtained in Reference Example 2. The resulting composition was granulated, molded, and tested for physical properties. The test results were as shown in Table 14.

TABLE 14

| Molding temp., °C. | Appearance of molded article | Tensile strength, kg/cm² | Weld line flexural strength, kg/cm² | Heat distortion temp., °C. | Mold shrinkage, % | |
|---|---|---|---|---|---|---|
| | | | | | MD | TD |
| 340 | Fine | 1180 | 690 | 298 | 0.1 | 1.3 |
| 360 | Fine | 1200 | 705 | 300 | 0.1 | 1.2 |
| 380 | Fine | 1205 | 720 | 300 | 0.1 | 1.2 |

What is claimed is:

1. A process for producing an aromatic polyester composition, which is characterized in that in producing an aromatic polyester represented by the general formula A,

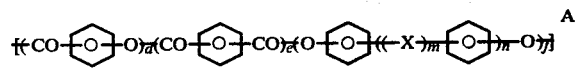

A (wherein X is an alkylene group having 1 to 4 carbon atoms, —O—, —SO₂—, —S—, or —CO—; m and n are each 0 or 1; the ratio of d to e is in the range of from 1:1 to 10:1; the ratio of e to f is in the range of from 9:10 to 10:9; and the substituents attached to the benzene ring are in para or meta position to one another), the polymerization is carried out using substantially no solvent, by the method of bulk polymerization at a temperature from about 200° C. to about 400° C., by mixing the reactants for forming the aromatic polyester with at least one polymer selected from the group consisting of polyalkylene terephthalates in the amount of about 5 to about 20% by weight of the composition ultimately produced, polyphenylene sulfides in the amount of about 5 to about 30% by weight of the composition ultimately produced, aromatic polysulfones in the amount of about 5 to 40% by weight of the composition ultimately produced, and aromatic polyesters represented by the general formula B,

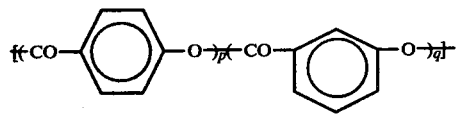

B wherein (p+q) is in the range of from 10 to 1,000 and p/(p+q)≧0.8, in the amount of about 5 to about 50% by weight of the composition ultimately produced.

2. A process according to claim 1, wherein the aromatic polyester represented by the general formula A is composed of: at least one of p-hydroxybenzoic acid moiety and m-hydroxybenzoic acid moiety; at least one of terephthalic acid moiety and isophthalic acid moiety; and 4,4'-dihydroxydiphenyl moiety.

3. An aromatic polyester composition produced by the process according to claim 1.

4. A process according to claim 1, wherein said bulk polymerization is carried out in the presence of a bulk polymerization catalyst.

* * * * *